US007988879B2

(12) United States Patent
Park et al.

(10) Patent No.: US 7,988,879 B2
(45) Date of Patent: Aug. 2, 2011

(54) METHOD FOR PREPARING LITHIUM METAL PHOSPHATE

(75) Inventors: Young-Sun Park, Daejeon (KR);
Jae-Won Lee, Daejeon (KR); Yong-Tae Lee, Jeonju-si (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/310,424

(22) PCT Filed: Aug. 20, 2007

(86) PCT No.: PCT/KR2007/003962
§ 371 (c)(1),
(2), (4) Date: Oct. 15, 2009

(87) PCT Pub. No.: WO2008/023908
PCT Pub. Date: Feb. 28, 2008

(65) Prior Publication Data
US 2010/0237275 A1 Sep. 23, 2010

(30) Foreign Application Priority Data

Aug. 21, 2006 (KR) .................. 10-2006-0078702

(51) Int. Cl.
C01B 25/30 (2006.01)
C01B 25/37 (2006.01)
H01M 4/58 (2010.01)
H01M 4/583 (2010.01)

(52) U.S. Cl. .............. 252/182.1; 252/500; 423/306; 423/137; 429/231.1; 429/221; 429/224; 429/231.5; 429/231.6

(58) Field of Classification Search ........... 252/182.1, 252/500, 518.1, 519.1, 520.4; 429/218.1, 429/221, 223, 224, 231.1, 231.2, 231.3, 231.5, 429/231.6, 231.95; 423/306, 137
See application file for complete search history.

(56) References Cited

U.S. PATENT DOCUMENTS

| | | | | |
|---|---|---|---|---|
| 6,136,472 A * | 10/2000 | Barker et al. | ............... | 429/218.1 |
| 6,730,281 B2 * | 5/2004 | Barker et al. | ................. | 423/306 |
| 7,390,473 B1 * | 6/2008 | Singhal et al. | ............... | 423/306 |
| 2001/0055718 A1 * | 12/2001 | Li et al. | ........................ | 429/221 |
| 2004/0151649 A1 * | 8/2004 | Hemmer et al. | ............. | 423/306 |

FOREIGN PATENT DOCUMENTS

| | | |
|---|---|---|
| CN | 1514804 A | 7/2004 |
| JP | 2006-344478 A | 12/2006 |

(Continued)

OTHER PUBLICATIONS

Office Action from corresponding Chinese Application No. 200780031089.6 dated Jul. 27, 2010.

*Primary Examiner* — Stanley Silverman
*Assistant Examiner* — Kallambella Vijayakumar
(74) *Attorney, Agent, or Firm* — Lerner, David, Littenberg, Krumholz & Mentlik, LLP

(57) ABSTRACT

Disclosed is a method for preparing a lithium metal phosphate represented by the following Formula 1 by using a mixture of a metal (M) with a metal oxide containing the same metal:

$$Li_xM_yPO_4 \quad \text{[Formula 1]}$$

wherein M is a transition metal element selected from Group 3 to 12 elements in the Periodic Table, Mg, Al, Ga and B; $0.05 \leq x \leq 1.2$; and $0.8 \leq y \leq 1.2$. Also, an electrode comprising the lithium metal phosphate as an electrode active material, and a secondary battery comprising the electrode are also disclosed.

10 Claims, 7 Drawing Sheets

FOREIGN PATENT DOCUMENTS

| KR | 10-1998-0078121 A | 11/1998 |
| KR | 10-2002-0016477 A | 3/2002 |
| KR | 10-2003-0045791 A | 6/2003 |
| KR | 2005-0000552 A | 1/2005 |
| KR | 10-2006-0054709 A | 5/2006 |
| WO | 2008/023908 A1 | 2/2008 |

* cited by examiner

METHOD FOR PREPARING LITHIUM METAL PHOSPHATE

CROSS REFERENCE TO RELATED APPLICATIONS

The present application is a national phase entry under 35 U.S.C. §371 of International Application No. PCT/KR2007/003962, filed Aug. 20, 2007, published in English, which claims the benefit of Korean Patent Application No. 10-2006-0078702, filed Aug. 21, 2006. The disclosures of said applications are incorporated by reference herein.

TECHNICAL FIELD

The present invention relates to a method for preparing a lithium metal phosphate. More particularly, the present invention relates to a cost-efficient method for preparing a lithium metal phosphate that may be used as an electrode active material for a lithium secondary battery.

BACKGROUND ART

Recently, compact secondary batteries including Ni-metal hydride (Ni-MH) secondary batteries or lithium secondary batteries have been in increasing demand as portable instruments, such as mobile phones, notebook computers or camcorders, have been developed intensively. Particularly, since a lithium secondary battery using lithium and a non-aqueous electrolyte is the most powerful candidate capable of realizing a compact, low-weight and high-energy density battery, active research and development into lithium secondary batteries have been conducted. In general, a lithium secondary battery utilizes a transition metal oxide, such as $LiCoO_2$, $LiNiO_2$ or $LiMn_2O_4$, as a cathode active material, and lithium metal or carbon as an anode active material. Additionally, an organic solvent containing lithium ions is used as electrolyte between the two electrodes to provide a lithium secondary battery.

Since $LiCoO_2$ was reported to be useful as a cathode active material for a lithium secondary battery in 1980, many studies about $LiCoO_2$ have been made to date, and $LiCoO_2$ have been widely used as a cathode active material for a common lithium secondary battery. However, because cobalt (Co) is one of the rarest elements on the earth, many attempts have been made to develop a novel cathode active material capable of substituting for $LiCoO_2$. Particularly, $LiFePO_4$ has a bulk density of 3.6 g/cm², generates a high potential of 3.4V, and provides a high theoretical capacity of 170 mAh/g. Additionally, Fe is one of the most abundant elements on the earth, is inexpensive, and can be obtained at a low cost. Further, because $LiFePO_4$ contains one electrochemically deintercalatable Li per Fe atom in its initial state, it is expected that $LiFePO_4$ can sufficiently substitute for $LiCoO_2$ as a novel cathode active material for a lithium secondary battery. In addition to $LiFePO_4$, $LiMPO_4$ containing a transition metal instead of Fe in $LiFePO_4$ is known to one skilled in the art. It is an interesting thing that $LiMPO_4$ provides a variable potential vs. Li depending on the kind of M.

A lithium metal phosphate represented by the formula of $Li_xMPO_4$ (wherein M is at least one element selected from the group consisting of Fe, Mn, Co, Ni, Cu, Zn, Mg, Cr, V, Mo, Ti, Al, Nb, B and Ga, and $0.05 \leq x \leq 1.2$) has an olivine-like crystal structure and undergoes little change in the crystal structure during charge/discharge cycles, and thus shows excellent cycle characteristics. Additionally, since the oxygen atoms in the crystal structure exist stably due to the covalent bonds with phosphorus atoms, a battery using a lithium metal phosphate is advantageous in that it shows little possibility of oxygen emission and has excellent safety even under high-temperature conditions.

For example, $LiFePO_4$ powder may be obtained via a conventional solid phase reaction process or a sol-gel process. Such conventional methods frequently use expensive $Fe^{2+}$ sources, such as iron acetate or iron oxalate, and require a high production cost. Meanwhile, when using $Fe^{3+}$ sources, there is a problem in that reduction of $Fe^{3+}$ cannot be accomplished sufficiently and $Fe^{3+}$ compounds remain as impurities.

Therefore, there has been a continuous need for developing a novel method for preparing a lithium metal phosphate with high reproducibility via simple processing steps at a low cost in an industrial scale.

DISCLOSURE OF THE INVENTION

Therefore, the present invention has been made in view of the above-mentioned problems. The inventors of the present invention have found that it is possible to prepare a nanocrystalline lithium metal phosphate having excellent physical properties in a cost-efficient manner by using a mixture of a metal oxide that is an inexpensive metal precursor with a metal present in its reduced state as a starting material for a solid phase reaction. Also, the inventors of the present invention have found that when the lithium metal phosphate is used as an electrode active material for a secondary battery, it is possible to provide a secondary battery with excellent capacity characteristics and cycle life characteristics.

The present invention is based on these findings.

According to an aspect of the present invention, there is provided a method for preparing a lithium metal phosphate represented by the following Formula 1 by using a mixture of a metal (M) with a metal oxide containing the same metal:

$$Li_xM_yPO_4 \qquad [\text{Formula 1}]$$

wherein M is a transition metal element selected from Group 3 to 12 elements in the Periodic Table, Mg, Al, Ga and B; $0.05 \leq x \leq 1.2$; and $0.8 \leq y \leq 1.2$.

According to another aspect of the present invention, there is provided a lithium metal phosphate obtained by the above method, an electrode comprising the lithium metal phosphate as an electrode active material, and a secondary battery comprising the electrode.

Hereinafter, the present invention will be explained in more detail with reference to the compound represented by Formula 1 wherein M=Fe. However, the scope of the present invention is not limited to $LiFePO_4$, and the present invention may be applied to other lithium metal phosphate compounds using metals other than Fe.

The method for preparing $LiFePO_4$ according to the present invention is performed by using a mixture of $Fe_2O_3$ and/or $Fe_3O_4$ with reduced iron Fe as a starting material.

$LiFePO_4$ may be obtained via a solid phase reaction process, a sol-gel process, a hydrothermal synthesis process, a precipitation process, or the like. There is no particular limitation in the method as long as the method is applicable to the preparation of powder. However, a solid phase reaction process is preferred.

Fe is present in the state of $Fe^{3+}$ with an oxidation number of 3 in $Fe_2O_3$, while it is present in the state of $Fe^{3+}$ combined with $Fe^{2+}$ in $Fe_3O_4$. Because Fe is present in the state of $Fe^{2+}$ with an oxidation number of 2 in $LiFePO_4$, it is necessary to use a compound containing ferrous iron ($Fe^{2+}$) as a starting material to obtain $LiFePO_4$. When using a compound containing ferric iron ($Fe^{3+}$) as a starting material, an additional step of reducing $Fe^{3+}$ into $Fe^{2+}$ is required. Additionally, since $Fe^{3+}$ is more stable than $Fe^{2+}$, it is necessary to control the process so as to inhibit $Fe^{2+}$ from being oxidized even when using a compound containing ferrous iron ($Fe^{2+}$) as a starting material.

When using iron oxide as a starting material, FeO containing ferrous iron ($Fe^{2+}$) may be used. However, FeO is more expensive than $Fe_2O_3$ and $Fe_3O_4$. Thus, according to the present invention, inexpensive $Fe_2O_3$ and/or $Fe_3O_4$ are/is used as a starting material so that $LiFePO_4$ can be obtained in a cost-efficient manner.

According to the present invention, the starting material comprises $Fe_2O_3$ and/or $Fe_3O_4$ in combination with reduced iron $Fe^0$. Thus, $Fe^{3+}$ is reduced into $Fe^{2+}$, and $Fe^0$ is oxidized into $Fe^{2+}$ to provide LiFePO4, in which only $Fe^{2+}$ exists.

To reduce $Fe_2O_3$ and/or $Fe_3O_4$, any conventional reducing agent other than reduced iron $Fe^0$ may be used. However, according to the present invention, $Fe^0$ is used as a reducing agent, so that $Fe^0$ is oxidized to serve as a source of $Fe^{2+}$ as well as functions as a reducing agent.

Although a mixture obtained by mixing $Fe_2O_3$ or $Fe_3O_4$ alone with $Fe^0$ may be used as the starting material, both $Fe_2O_3$ and $Fe_3O_4$ may be mixed with reduced iron $Fe^0$. Herein, the mixing ratio is determined in consideration of the stoichiometry and oxidation number of the final product.

The step of mixing $Fe_2O_3$ and/or $Fe_3O_4$ with $Fe^0$ may be performed by a powder mixing process generally known to those skilled in the art, and optionally includes a mechanical milling step to form FeO.

The method according to the present invention may comprise the steps of:

(a) mixing a metal, a metal oxide containing the same metal, a lithium salt and a phosphate salt;

(b) optionally, adding a carbonaceous material to the mixture obtained from step (a), followed by mixing; and (c) heat treating and firing the mixture obtained from step (a) or (b).

In step (a), there is no particular limitation in the lithium salt, as long as the salt functions as a lithium ion ($Li^+$) source. Non-limiting examples of the lithium salt include lithium chloride (LiCl), lithium carbonate ($Li_2CO_3$), lithium hydroxide (LiOH), lithium phosphate ($Li_3PO_4$) and lithium nitrate ($LiNO_3$). Such lithium salts may be used alone or in combination.

Also, there is no particular limitation in the phosphate salt, as long as the salt functions as a phosphate ion ($PO_4^{3-}$) source. Non-limiting examples of the phosphate salt include $(NH_4)H_2PO_4$, $(NH_4)_2HPO_4$, $(NH_4)_3PO_4$, $H_3PO_4$, $P_2O_5$, $P_4O_{10}$, $Li_3PO_4$ and $FePO_4 \cdot nH_2O$. Such phosphate salts may be used alone or in combination.

Additionally, a salt capable of providing a lithium ion and a phosphate ion at the same time, such as $Li_2HPO_4$, $LiH_2PO_4$ or $Li_3PO_4$, may substitute for the lithium salt and the phosphate salt.

In the step of mixing $Fe_2O_3$ and/or $Fe_3O_4$ with $Fe^0$, the mixing ratio may be adequately controlled depending on the stoichiometry and oxidation number. For example, 0.5 moles of $Fe^0$ is required per mole of $Fe^{3+}$. When mixing $Fe_2O_3$ alone with $Fe^0$, 1 mole of $Fe^0$ is required per mole of $Fe_2O_3$ because 1 mole of $Fe_2O_3$ contains 2 moles of $Fe^{3+}$. When mixing $Fe_3O_4$ alone with $Fe^0$, 1 mole of $Fe^0$ is required per mole of $Fe_3O_4$, because 1 mole of $Fe_3O_4$ contains 2 moles of $Fe^{3+}$. When mixing both $Fe_2O_3$ and $Fe_3O_4$ with $Fe^0$, the requirement of $Fe^0$ can be calculated by calculating the mole number of $Fe^{3+}$ from the mixing ratio of $Fe_2O_3$ to $Fe_3O_4$.

In step (b), a carbonaceous material may be further mixed with the mixture obtained from step (a). Such addition of the carbonaceous material allows the subsequent, heat treatment step to be carried out under a stronger reductive atmosphere, and serves to reduce any remaining unreacted $Fe^{3+}$ completely.

There is no particular limitation in the carbonaceous material, as long as the carbonaceous material can make a reductive atmosphere upon the heat treatment. Non-limiting examples of the carbonaceous material include carbon black, sucrose, pitch, cellulose acetate, organic acids, resin, resorcinol formaldehyde, or the like.

In step (c), the mixture obtained from the preceding step, i.e. step (a) or step (b) is heat treated and fired to provide $LiFePO_4$. Such heat treatment is performed preferably under an inert atmosphere.

The inert atmosphere may be obtained by purging $N_2$ or $N_2+H_2$ gas through a firing furnace. At this time, the heat treatment temperature preferably ranges from 450° C. to 850° C. If the heat treatment temperature is below the aforementioned range, the desired product cannot be formed easily and the resultant product has poor crystallinity. If the heat treatment temperature is above the aforementioned range, crude particles are formed and such particles have poor quality as an active material.

According to another embodiment of the present invention, $Fe_2O_3$ and/or $Fe_3O_4$ combined with $Fe^0$ is subjected to a mechanical milling step using a ball mill, etc., so that the mechanical energy can induce the redox reaction for producing FeO. In general, a solid-phase redox reaction is performed by heat energy derived from heating. However, according to the present invention, impact energy during the mechanical milling, such as ball milling, can serve as an energy source for inducing the redox reaction from $Fe^{3+}$ to $Fe^{2+}$ and from $Fe^0$ to $Fe^{2+}$ in the step of mixing $Fe_2O_3$ and/or $Fe_3O_4$ with $Fe^0$.

Therefore, the scope of the present invention also includes a method for preparing $LiFePO_4$ comprising the steps of subjecting Fe and at least one material selected from the group consisting of $Fe_2O_3$ and $Fe_3O_4$ to mechanical milling to obtain FeO, and preparing $LiFePO_4$ by using the FeO as a starting material.

In this manner, it is possible to obtain $LiFePO_4$ in a cost-efficient process. As mentioned above, this is not limited to $LiFePO_4$ and is applied to lithium metal phosphate compounds containing elements other than Fe.

In other words, the lithium metal phosphate according to the present invention represented by the formula of $Li_xM_yPO_4$ (wherein M is a transition metal element selected from Group 3 to 12 elements in the Periodic Table, Mg, Al, Ga and B; $0.05 \leq x \leq 1.2$; and $0.8 \leq y \leq 1.2$) is a compound having a regular olivine structure, and belongs to a general group known as a polyanionic compound having oxygen octahedrons occupied by tetrahedral anionic units $(PO_4)^{n-}$ and metal M. Additionally, lithium metal phosphates represented by the formula of $Li_xM_yPO_4$ (wherein P is substituted with As, S, Si, Mo, W, Al or B) are also included in the scope of the present invention.

<Manufacture of Electrode and Secondary Battery>

The electrode comprising the lithium metal phosphate obtained according to the present invention as an electrode active material may be manufactured by a conventional method known to those skilled in the art. For example, the electrode may further comprise a conductive agent for imparting electroconductivity and a binder for allowing adhesion among the conductive agent, the electrode active material and a collector, in addition to the electrode active material, i.e. lithium metal phosphate.

More particularly, the electrode active material obtained as described above is mixed with 1~30 wt % of a conductive agent and 1~10 wt % of a binder, based on the weight of the electrode active material, and then the resultant mixture is added to a dispersion solvent under agitation to form paste. Then, the paste is applied onto a metallic collector, followed by compressing and drying, to provide a laminate-shaped electrode.

As the conductive agent, carbon black is generally used. Commercially available products as the conductive agent include acetylene black (available from Chevron Chemical Company, Gulf Oil Company, etc.), Ketjen Black EC series (available from Armak Company), Vulcan XC-72 (available from Cabot Company) and Super P (available from MMM), or the like.

Typical examples of the binder include polytetrafluoroethylene (PTFE), polyvinylidene fluoride (PVdF) or a copolymer thereof, cellulose, etc. Typical examples of the dispersant include isopropyl alcohol, N-methyl pyrrolidone (NMP), acetone, etc.

There is no particular limitation in the metal forming the metallic collector, as long as the metal is highly conductive, allows easy adhesion of the paste thereto, and has no reactivity in the normal drive voltage range of the battery using the same. Typical examples of the metallic collector include mesh or foil formed of aluminum or stainless steel.

Also, the present invention provides a secondary battery comprising the electrode according to the present invention. The secondary battery according to the present invention may be obtained by a method generally known to those skilled in the art without any particular limitation. For example, a separator is interposed between a cathode and an anode to form an electrode assembly, and then a non-aqueous electrolyte is injected thereto. Additionally, the electrodes, separator, non-aqueous electrolyte and other additives, if desired, may be those currently used in the art.

Further, a porous separator may be used as the separator for manufacturing the battery according to the present invention. Particular examples of the porous separator include but are not limited to: polypropylene-based, polyethylene-based, polyolefin-based separators, etc.

The non-aqueous electrolyte for the secondary battery according to the present invention may include a cyclic carbonate and/or linear carbonate. Particular examples of the cyclic carbonate include ethylene carbonate (EC), propylene carbonate (PC), gamma-butyrolactone (GBL), etc. Particular examples of the linear carbonate include diethyl carbonate (DEC), dimethyl carbonate (DMC), ethyl methyl carbonate (EMC), methyl propyl carbonate (MPC), etc. In addition to the carbonate compound, the non-aqueous electrolyte for the secondary battery according to the present invention comprises a lithium salt. Particular examples of the lithium salt include $LiClO_4$, $LiCF_3SO_3$, $LiPF_6$, $LiBF_4$, $LiAsF_6$, $LiN(CF_3SO_2)_2$, etc.

BRIEF DESCRIPTION OF THE DRAWINGS

The foregoing and other objects, features and advantages of the present invention will become more apparent from the following detailed description when taken in conjunction with the accompanying drawings in which.

MODE FOR CARRYING OUT THE INVENTION

Reference will now be made in detail to the preferred embodiments of the present invention. It is to be understood that the following examples are illustrative only and the present invention is not limited thereto.

Example 1

First, 1 mole of $Fe_3O_4$ was mixed with 1 mole of Fe powder under a nitrogen atmosphere via planetary milling or ball milling. The mixture was mixed uniformly with 2 moles of $Li_2CO_3$, 4 moles of $(NH_4)_2HPO_4$ and ketjen black, and the resultant mixture was fired in an electric furnace at 750° C. for 8 hours to obtain a $LiFePO_4$/carbon composite. The firing step was performed under a reductive atmosphere ($N_2+H_2$ 2 vol %). The content of carbon in the composite was 9 wt %.

The composite obtained as described above was applied to a secondary battery according to the following method and the quality of the battery was evaluated. First, 88 parts by weight of the $LiFePO_4$/carbon composite was mixed with 6 parts by weight of acetylene black as a conductive agent and 6 parts by weight of PVDF as a binder, and then the resultant mixture was added to NMP (N-methyl-2-pyrrolidone) to form cathode slurry. The cathode slurry was applied onto an aluminum (Al) collector, followed by drying, to provide a cathode.

As an electrolyte, 1M $LiPF_6$/ethylene carbonate (EC):ethyl methyl carbonate (EMC) (v:v=1:2) was used and lithium foil was used as an anode. A coin-like half cell was provided by using the cathode, the anode and the electrolyte.

Example 2

A $LiMnPO_4$/carbon composite was provided in the same manner as described in Example 1, except that $Mn_3O_4$ was used instead of $Fe_3O_4$, and Mn powder was used instead of Fe powder.

A coin-like half cell was provided and evaluated in the same manner as described in Example 1, except that the above $LiMnPO_4$/carbon composite was used as a cathode active material.

Comparative Example 1

A $LiFePO_4$/carbon composite was provided by mixing $Fe_2O_3$, $Li_2CO_3$ and $(NH_4)_2HPO_4$ in a ratio of 1:1:2 and by firing the resultant mixture together with ketjen black in the same manner as described in Example 1. The content of carbon in the composite was 9 wt %.

A coin-like half cell was provided in the same manner as described in Example 1, except that the above $LiFePO_4$/carbon composite was used as a cathode active material.

Comparative Example 2

A $LiMnPO_4$/carbon composite was provided in the same manner as described in Comparative Example 1, except that $Mn_2O_3$ was used instead of $Fe_2O_3$.

A coin-like half cell was provided and evaluated in the same manner as described in Example 1, except that the above $LiMnPO_4$/carbon composite was used as a cathode active material.

Experimental Example

Figure 1:
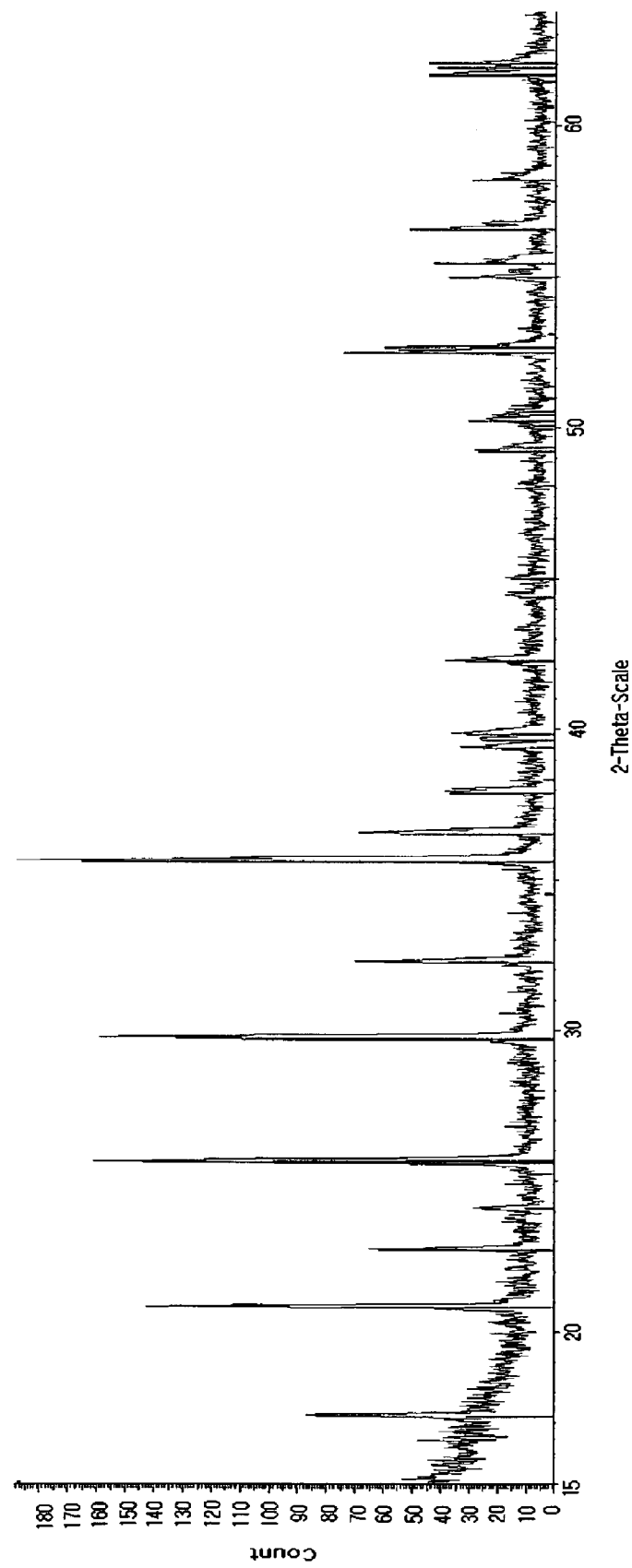
FIG. 1 is the X-ray diffraction pattern of the composite of $LiFePO_4$ with carbon according to Example 1.
Figure 2:
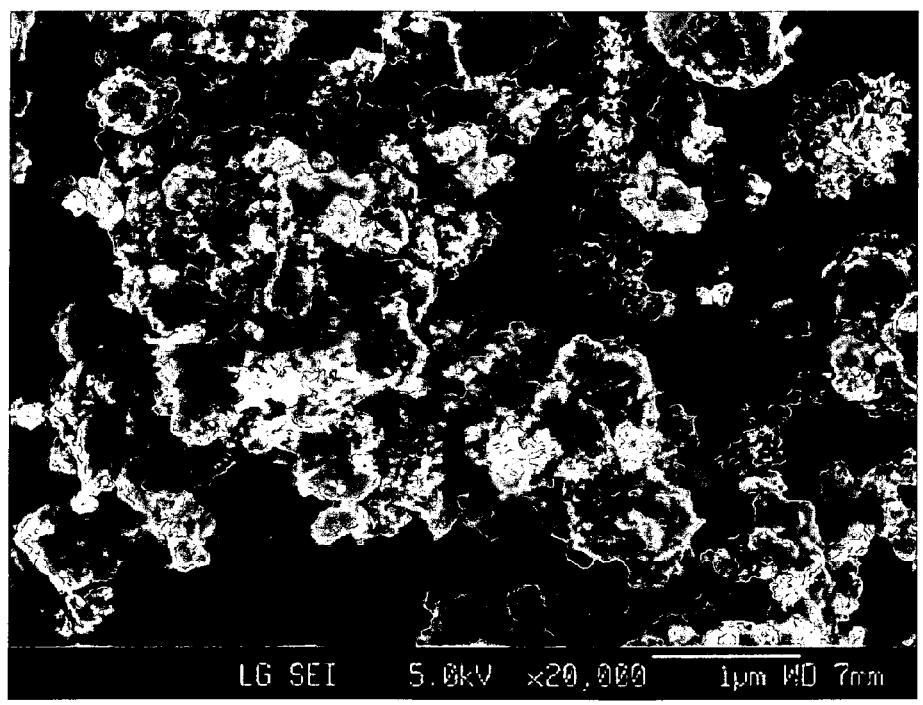
FIG. 2 is the photographic view of the composite of $LiFePO_4$ with carbon according to Example 1, taken by scanning electron microscopy (SEM, ×20,000)
Figure 3:
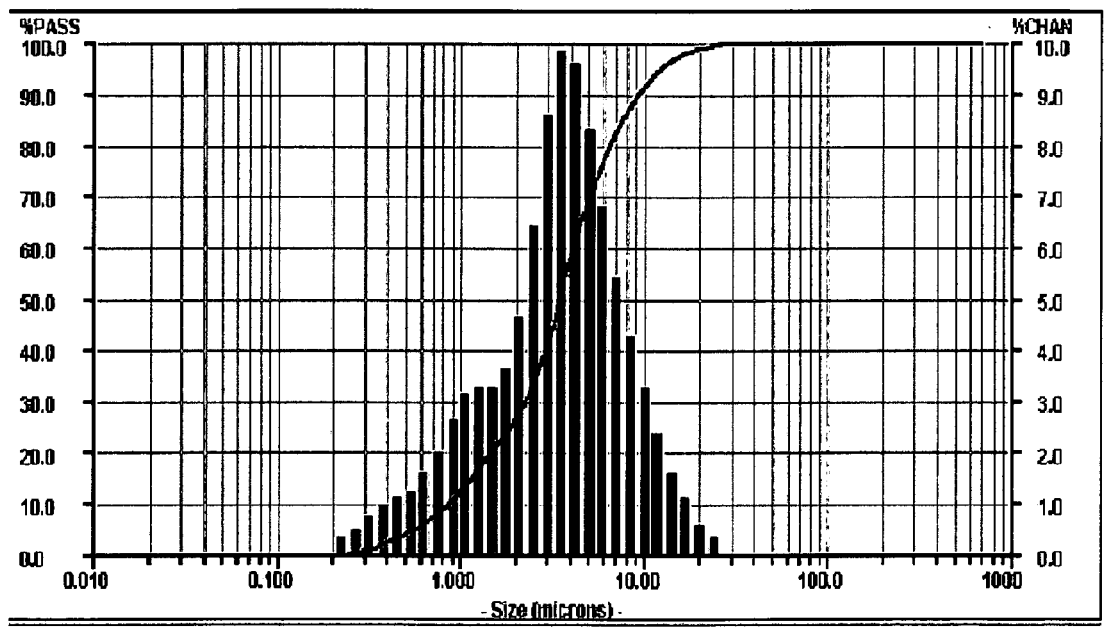
FIG. 3 is the graph showing the particle size distribution of the composite of $LiFePO_4$ with carbon according to Example 1.
Figure 4:
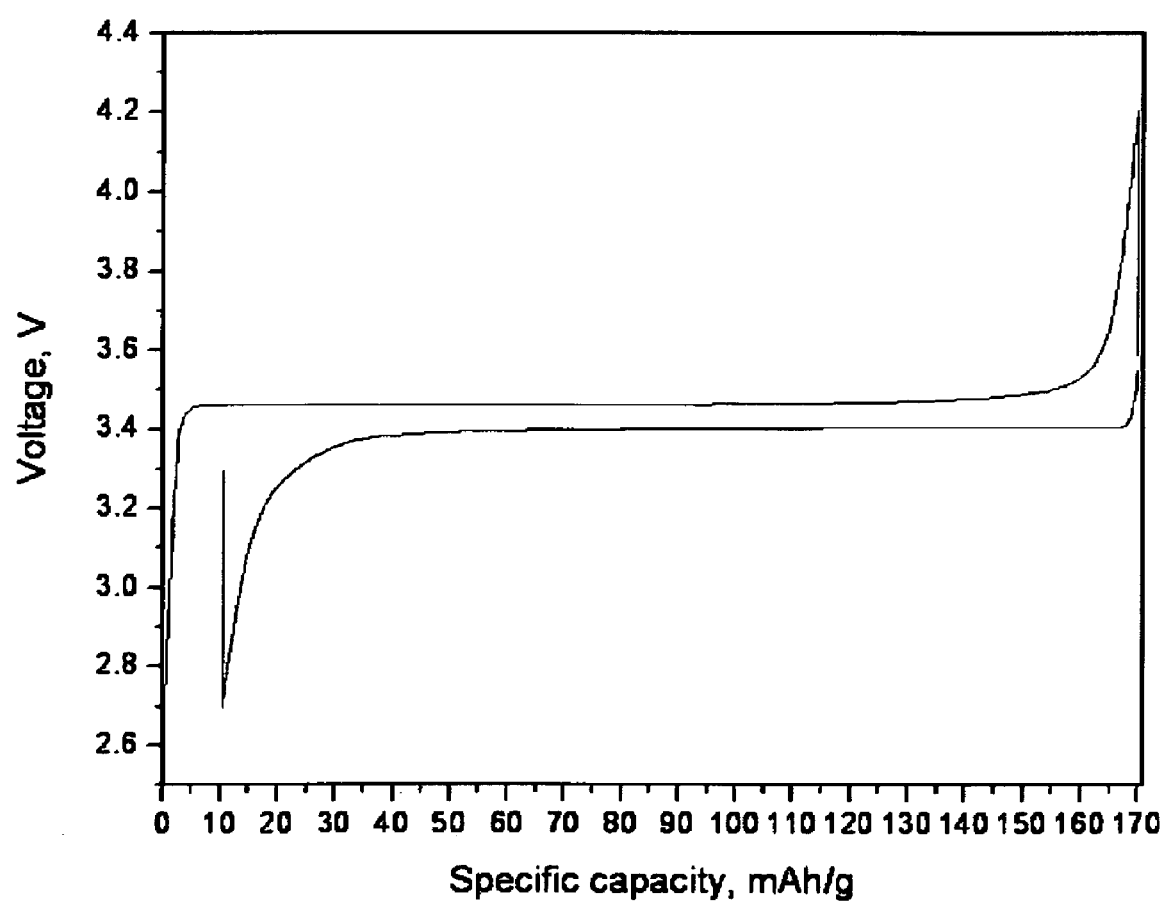
FIG. 4 is the graph showing the initial charge-discharge profile of the coin-like half cell obtained according to Example 1.
Figure 5:
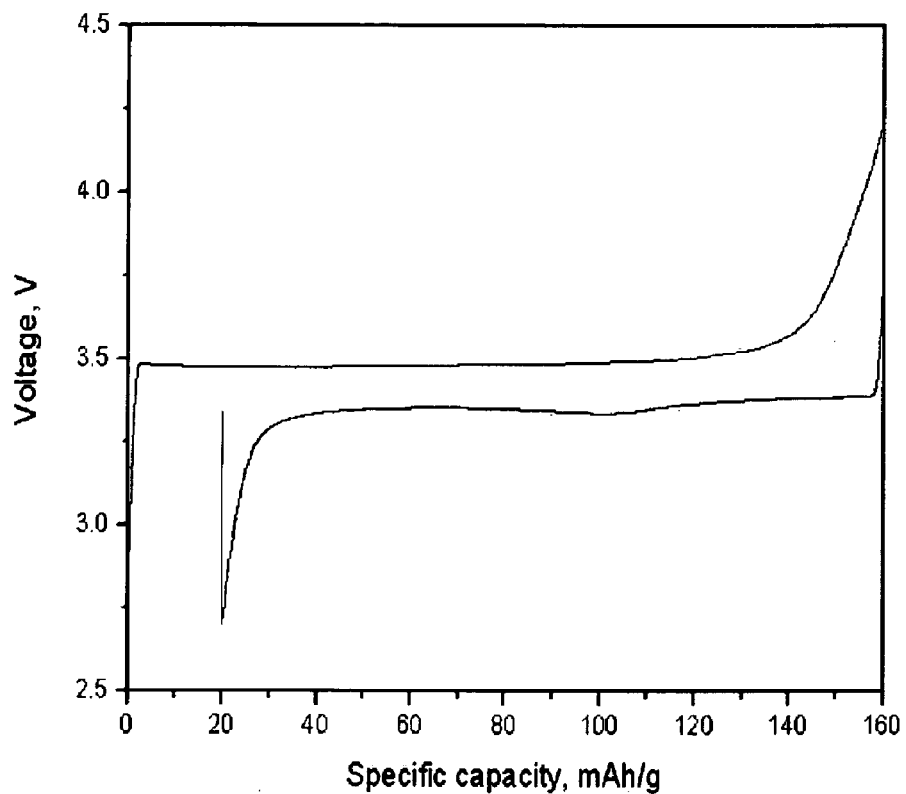
FIG. 5 is the graph showing the initial charge-discharge profile of the coin-like half cell obtained according to Comparative Example 1.
Figure 6:
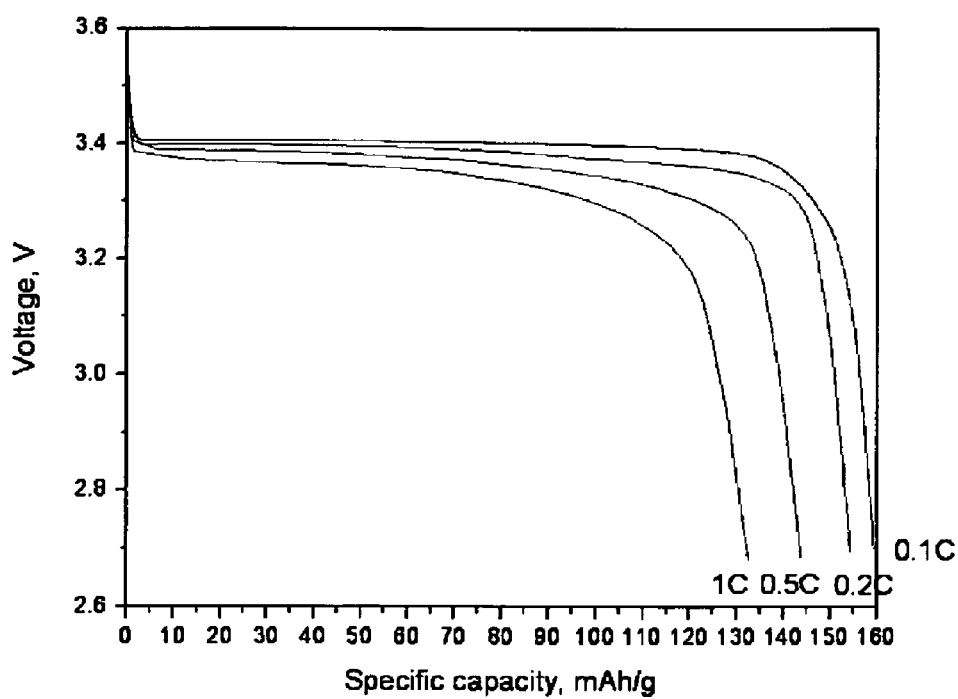
FIG. 6 is the graph showing the rate capability of the coin-like half cell obtained according to Example 1.
Figure 7:
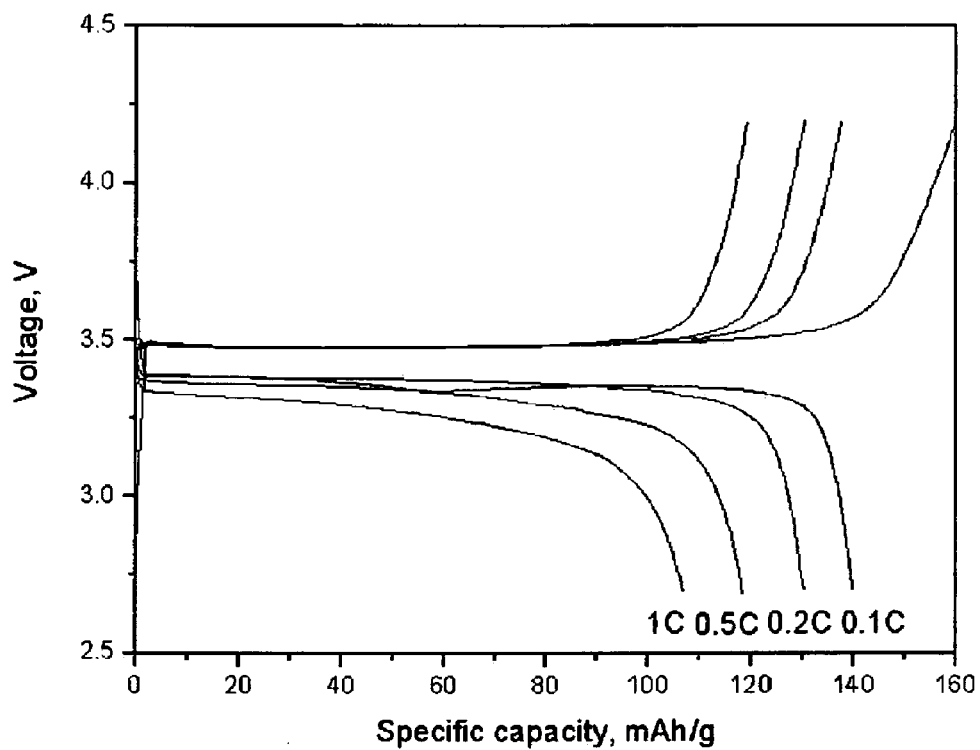
FIG. 7 is the graph showing the rate capability of the coin-like half cell obtained according to Comparative Example 1.

The $LiFePO_4$/carbon composite obtained according to Example 1 was subjected to X-ray diffraction analysis. After the analysis, it could be seen that $LiFePO_4$ with excellent crystallinity was formed (see FIG. 1). Additionally, the particle shape and the particle distribution were observed by way of SEM analysis and particle size analysis (see FIGS. 2 and 3). As can be seen from the photograph taken by SEM, sub-micron sized primary particles aggregate to form secondary particles having a $D_{50}$ value of about 3 μm. Such a shape and size of the particles play an important role in increasing the quality of $LiFePO_4$ particles, which, otherwise, shows a low lithium diffusion rate therein.

Since nanoparticles have a large specific surface area, they show a large area on which Li ions are diffused. As the particle size decreases, Li ions are diffused over a shorter distance to the center of the bulk of the particles, and thus the Li intercalation/deintercalation rate increases accordingly, resulting in an improvement in the quality of the battery.

Figure 8:
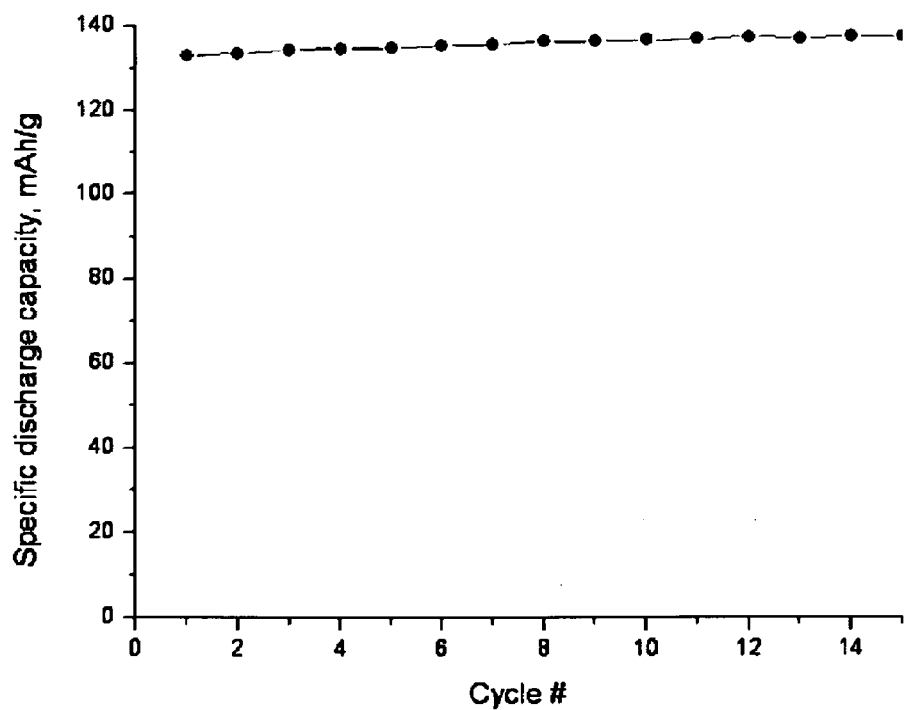
FIG. 8 is the graph showing the cycle characteristics of the coin-like half cell obtained according to Example 1 (1 C charge/1 C discharge)

After evaluating the quality of the coin-like half cells, the half cell according to Example 1 has a reversible capacity of 160 mAh/g or higher at 0.1 C. The half cell according to Example 1 shows higher quality than the half cell according to Comparative Example 1 (see FIGS. 4 to 7). The half cell according to Example 1 was tested by subjecting it to 30 charge/discharge cycles to evaluate the cycle characteristics. After the test, the half cell according to Example 1 showed little drop in the capacity (see FIG. 8).

Figure 9:
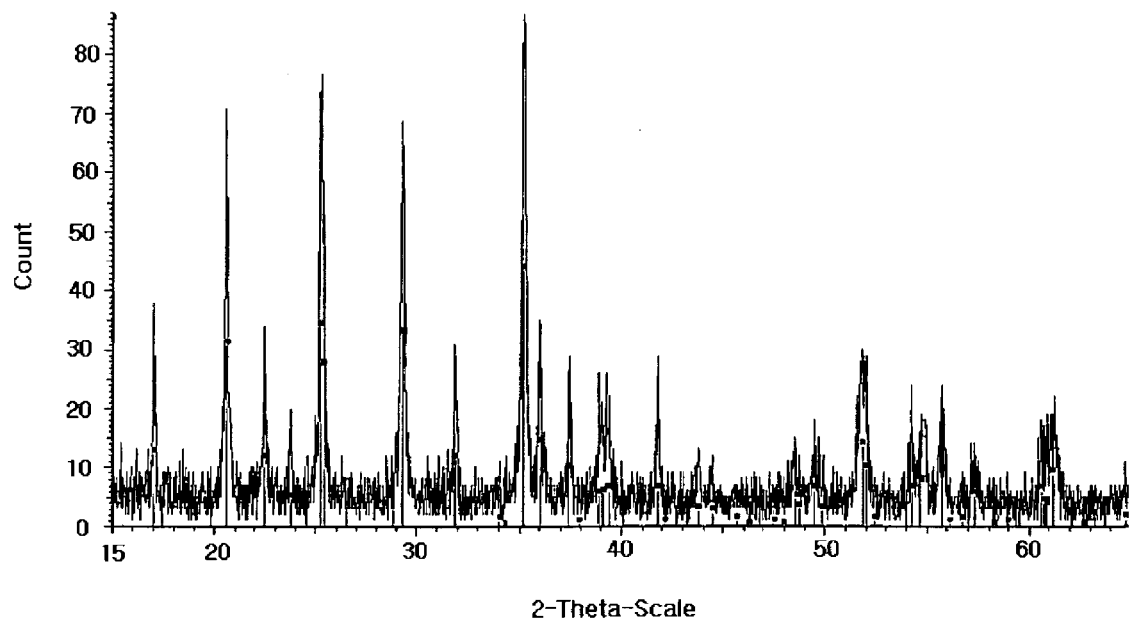
FIG. 9 is the X-ray diffraction pattern of the composite of $LiMnPO_4$ with carbon according to Example 2.

Meanwhile, as can be seen from FIG. 9, the $LiMnPO_4$/carbon composite obtained according to Example 2 also has excellent crystallinity.

Figure 10:
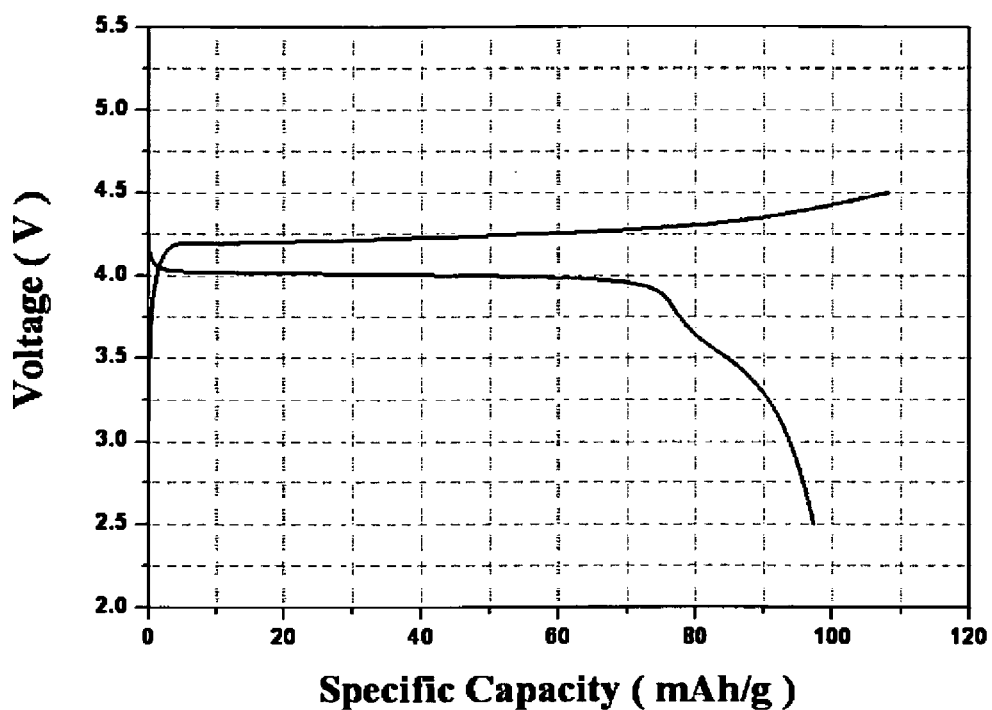
FIG. 10 is the graph showing the initial charge-discharge profile of the coin-like half cell obtained according to Example 2.
Figure 11:
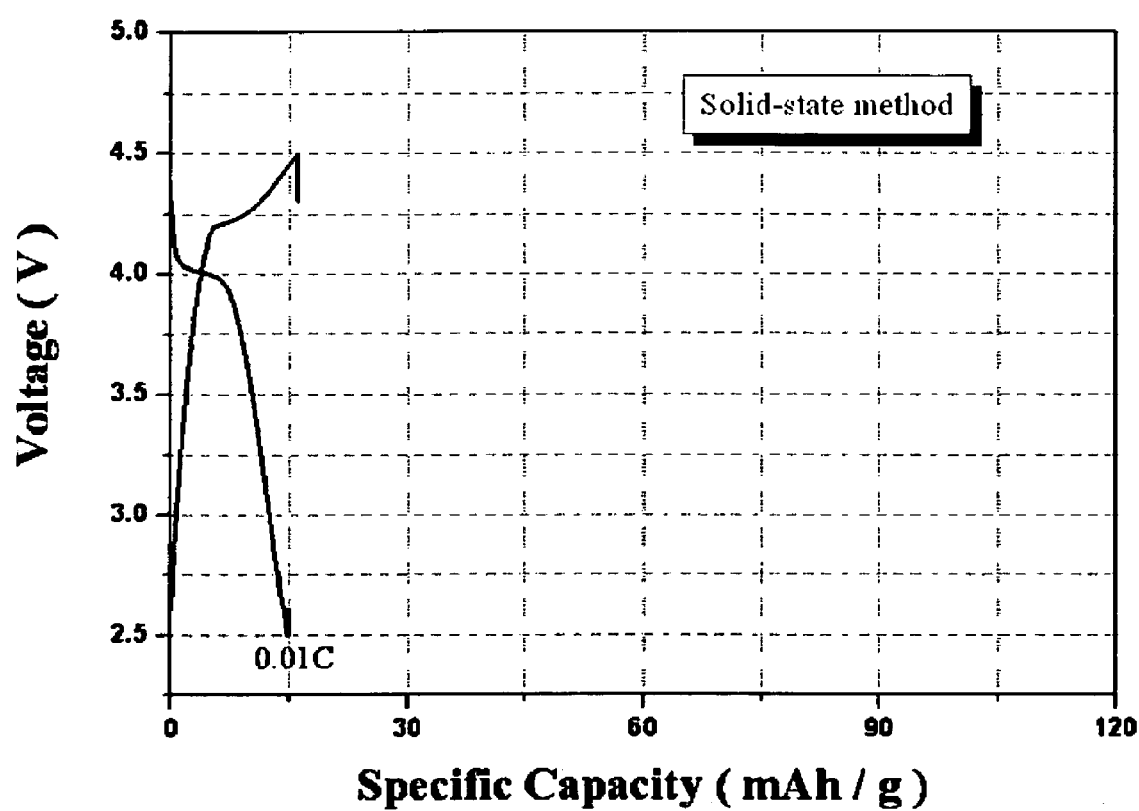
FIG. 11 is the graph showing the initial charge-discharge profile of the coin-like half cell obtained according to Comparative Example 2.

Additionally, as can be seen from FIG. 10, the half cell according to Example 2 has a reversible capacity of 97 mAh/g. The half cell according to Example 2 shows higher quality than the half cell according to Comparative Example 2.

INDUSTRIAL APPLICABILITY

As can be seen from the foregoing, according to the present invention, it is possible to obtain a nanocrystalline lithium transition metal phosphate in a cost-efficient manner by using a mixture containing a metal oxide, an inexpensive metal precursor, and a reduced metal, as a starting material for the solid phase reaction. Also, it is possible to provide a secondary battery with more excellent capacity characteristics and lifespan characteristics by using the lithium transition metal phosphate as an electrode active material for the secondary battery.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for preparing a lithium metal phosphate represented by the following Formula 1 by using a mixture of a metal (M) with a metal oxide containing the same metal:

$$Li_xM_yPO_4 \quad \text{[Formula 1]}$$

wherein M is a transition metal element selected from Group 3 to 12 elements in the Periodic Table, Mg, Al, Ga and B; $0.05 \leq x \leq 1.2$; and $0.8 \leq y \leq 1.2$; and wherein the metal and the metal oxide are subjected to mechanical milling to provide a metal oxide only having an oxidation number of +2, and the metal oxide is used as the starting material for preparing the lithium metal phosphate.

2. The method according to claim 1, which comprises the steps of:
(a) mixing a metal, a metal oxide containing the same metal, a lithium salt and a phosphate salt; and
(b) heat treating and firing the mixture obtained from step (a).

3. The method according to claim 2, which further comprises a step of adding a carbonaceous material to the mixture obtained from step (a), followed by mixing.

4. The method according to claim 2, wherein the lithium salt is selected from the group consisting of lithium chloride (LiCl), lithium carbonate ($Li_2CO_3$), lithium hydroxide (LiOH), lithium phosphate ($Li_3PO_4$) and lithium nitrate ($LiNO_3$).

5. The method according to claim 2, wherein the phosphate salt is selected from the group consisting of $(NH_4)H_2PO_4$, $(NH_4)_2HPO_4$ $(NH_4)_3PO_4$, $H_3PO_4$, $P_2O_5$, $P_4O_{10}$, $Li_3PO_4$ and $FePO_4 \cdot nH_2O$.

6. The method according to claim 3, wherein the carbonaceous material is selected from the group consisting of carbon black, sucrose, pitch, cellulose acetate, organic acids, resin and resorcinol formaldehyde.

7. The method according to claim 2, wherein the heat treating step is carried out at a temperature of 450~850° C.

8. The method according to claim 2, wherein the heat treating step is carried out under an inert atmosphere.

9. The method according to claim 1, wherein the metal in the metal oxide has an oxidation number of +3 alone or an oxidation number of +3 and +2.

10. The method according to claim 1, wherein metal M is Fe or Mn.

* * * * *

UNITED STATES PATENT AND TRADEMARK OFFICE
CERTIFICATE OF CORRECTION

PATENT NO. : 7,988,879 B2
APPLICATION NO. : 12/310424
DATED : August 2, 2011
INVENTOR(S) : Young-Sun Park et al.

It is certified that error appears in the above-identified patent and that said Letters Patent is hereby corrected as shown below:

Column 1, line 37, "used as electrolyte" should read --used as an electrolyte--.
Column 1, line 42, the second "$LiCoO_2$ have been" should read --$LiCoO_2$ has been--.
Column 4, line 3, delete the "," between "subsequent" and "heat".
Column 6, line 55, "form cathode slurry" should read --form a cathode slurry--.
Column 8, line 49, insert a --,-- between "$(NH_4)_2HPO_4$" and "$(NH_4)_3PO_4$".

Signed and Sealed this
Twelfth Day of March, 2013

Teresa Stanek Rea
*Acting Director of the United States Patent and Trademark Office*